United States Patent [19]

Sterr

[11] Patent Number: 4,951,311

[45] Date of Patent: Aug. 21, 1990

[54] TELEPHONE CALL INDICATOR

[76] Inventor: Kevin K. Sterr, P.O. Box 176, S. Milwaukee St., Theresa, Wis. 53091

[21] Appl. No.: 377,127

[22] Filed: Jul. 10, 1989

[51] Int. Cl.$^5$ ............................................. H04M 1/00
[52] U.S. Cl. .................................... 379/376; 379/396; 362/88
[58] Field of Search .................... 315/158; 362/88, 100; 379/376, 396, 373, 387; 350/278

[56] References Cited

U.S. PATENT DOCUMENTS

| | | | |
|---|---|---|---|
| 1,702,967 | 2/1929 | Hays | 362/88 |
| 2,813,154 | 11/1957 | Rabinow. | |
| 2,960,576 | 11/1960 | Kath. | |
| 3,683,121 | 8/1972 | Aksu. | |
| 3,819,873 | 6/1974 | Stockton et al. | |
| 3,842,216 | 10/1974 | Owen et al. | |
| 4,587,459 | 5/1986 | Blake | 315/158 |
| 4,701,022 | 10/1987 | Jacob | 350/278 |
| 4,747,133 | 5/1988 | Valenzona et al. | 379/376 |
| 4,757,430 | 7/1988 | Dubak et al. | 362/100 |

FOREIGN PATENT DOCUMENTS 0002472  1/1984  Japan ................................. 379/376

OTHER PUBLICATIONS

"Automatic Indoor Night Light", Radio Shack, 1986, Catalog, p. 146.

*Primary Examiner*—Jin F. Ng
*Assistant Examiner*—Randall S. Vaas
*Attorney, Agent, or Firm*—Jerry T. Kearns

[57] ABSTRACT

A telephone includes a lamp pivotally mounted to the telephone housing. An inductive pick-up detects an incoming call on a telephone line and actuates a switching device to energize the lamp if the ambient light level adjacent the telephone is below a predetermined level as determined by a photosensor on the telephone housing. After disconnection of the call, a time delay circuit de-energizes the lamp after a predetermined time interval. The ambient light level at which the lamp will be illuminated and the time delay between call disconnection and lamp shut-off are programmable by a user. A manual override switch allows activation or deactivation of the lamp independently of detection of an incoming call or the ambient light level.

4 Claims, 4 Drawing Sheets

TELEPHONE CALL INDICATOR

BACKGROUND OF THE INVENTION

1. Field of the Invention

The present invention relates to telephone call indicators, and more particularly pertains to an improved telephone which has a lamp integrally provided on the telephone housing. Many individuals receive telephone calls at night or in dimly lit rooms. Upon answering such a call, the individual frequently must take a written message from the caller. This requires that the individual put down the telephone and turn on room lighting. This is especially inconvenient when an individual is awakened by a telephone call in bed. In order to overcome this problem, the present invention provides a lamp associated with a telephone which is automatically illuminated upon detection of an incoming call.

2. Description of the Prior Art

Various types of telephone call indicators are known in the prior art. A typical example of such a telephone call indicator is to be found in U.S. Pat. No. 2,813,154, which issued to J. Rabinow on Nov. 12, 1957. This patent discloses a telephone supporting platform including a vibration switch operatively connected for illuminating a lamp upon ringing of a mechanical clapper type telephone bell. U.S. Pat. No. 2,960,576, which issued to N. Kath on Nov. 15, 1960, discloses a signal control actuator for a telephone in which a plurality of electrical outlets are energized upon detection of a telephone call. The device utilizes a mechanical linkage activated by a mechanical telephone bell clapper. U.S. Pat. No. 3,683,121 which issued to A. Aksu on Aug. 8, 1972, discloses a telephone call indicator including a sensor responsive to the ring of a telephone. The device is designed for use by telephone answering service subscribers to provide an indication of whether their telephone has rung in their absence. The device utilizes a lamp which is illuminated upon detection of a telephone ring signal by a microphone. U.S. Pat. No. 3,819,873, which issued to R. Stockton et al, on June 25, 1974, discloses a telephone call indicator which utilizes an induction pick up coil for receiving a signal from a telephone set. An amplifier amplifies the signal from the induction pick-up and a normally open latching switch in circuit with a lamp and a power supply provides a visual indication of an incoming telephone call. U.S. Pat. No. 3,842,216, which issued to J. Owen et al, on Oct. 15, 1974, discloses a circuit for sensing the presence of AC ringing current in a telephone line. The device includes a neon lamp which flashes at the same rate as the frequency of current in the line.

While the above mentioned devices are directed to telephone call indicators, none of these devices disclose a lamp integrally formed with a telephone housing which is activated upon detection of an incoming telephone call only when ambient light adjacent the telephone is below a predetermined level as detected by a photosensor. Additionally, none of the aforesaid devices disclose the use of a time delay circuit for de-energizing a lamp at a predetermined time interval after disconnection of a call. Inasmuch as the art is relatively crowded with respect to these various types of telephone call indicators, it can be appreciated that there is a continuing need for and interest in improvements to such telephone call indicators, and in this respect, the present invention addresses this need and interest.

SUMMARY OF THE INVENTION

In view of the foregoing disadvantages inherent in the known types of telephone call indicators now present in the prior art, the present invention provides an improved telephone call indicator. As such, the general purpose of the present invention, which will be described subsequently in greater detail, is to provide a new and improved telephone call indicator which has all the advantages of the prior art telephone call indicators and none of the disadvantages.

To attain this, a representative embodiment of the concepts of the present invention is illustrated in the drawings and makes use of a telephone including a lamp pivotally mounted to the telephone housing. An inductive pick-up detects an incoming call on a telephone line and actuates a switching device to energize the lamp if the ambient light level adjacent the telephone is below a predetermined level as determined by a photosensor on the telephone housing. After disconnection of the call, a time delay circuit de-energizes the lamp after a predetermined time interval. The ambient light level at which the lamp will be illuminated and the time delay between call disconnection and lamp shut-off are programmable by a user. A manual override switch allows activation or deactivation of the lamp independently of detection of an incoming call or the ambient light level.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved telephone call indicator which has all the advantages of the prior art telephone call indicators and none of the disadvantages.

It is another object of the present invention to provide a new and improved telephone call indicator which may be easily and efficiently manufactured and marketed.

It is a further object of the present invention to provide a new and improved telephone call indicator which is of a durable and reliable construction.

An even further object of the present invention is to provide a new and improved telephone call indicator which is susceptible of a low cost of manufacture with regard to both materials and labor, and which accordingly is then susceptible of low prices of sale to the consuming public, thereby making such telephone call indicators economically available to the buying public.

Still yet another object of the present invention is to provide a new and improved telephone call indicator which provides in the apparatuses and methods of the prior art some of the advantages thereof, while simultaneously overcoming some of the disadvantages normally associated therewith.

Still another object of the present invention is to provide a new and improved telephone call indicator which illuminates a lamp upon detection of an incoming telephone call.

Yet another object of the present invention is to provide a new and improved telephone call indicator which illuminates a lamp upon detection of an incoming telephone call only when the ambient light level adjacent the telephone is below a predetermined level.

Even still another object of the present invention is to provide a new and improved telephone call indicator which allows an individual to manually override a lamp which is controlled by detection of and disconnection of a telephone call.

Yet another object of the present invention is to provide a new and improved telephone call indicator which, upon disconnection of a telephone call, causes a hang-up sensor to activate a timing circuit to automatically de-energize an illuminated lamp after a predetermined time delay.

Yet another object of the present invention is to provide a new and improved telephone call indicator which, a predetermined time delay after a telephone call is disconnected, causes an illuminated lamp to be automatically de-energized by a timing circuit.

Still yet another object of the present invention is to provide a new and improved telephone call indicator which detects an incoming telephone call by passive means, such as an induction pick up coil.

Another object of the present invention is to provide a new and improved telephone call indicator which detects a telephone call disconnection (hang-up) by passive means, such as an induction pick-up coil.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
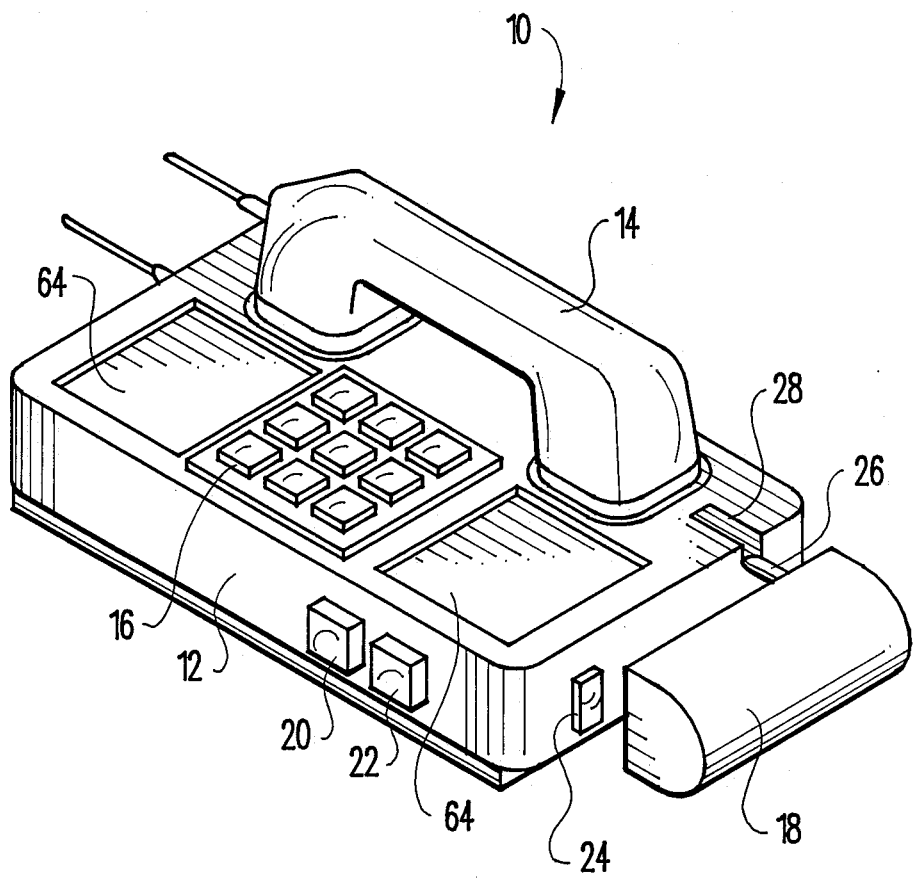
FIG. 1 is a perspective view of a telephone incorporating the features of the present invention.

With reference now to the drawings, and in particular to FIG. 1 thereof, a new and improved telephone call indicator embodying the principles and concepts of the present invention and generally designated by the reference numeral 10 will be described.

More specifically, it will be noted that the first embodiment 10 of the invention includes a telephone having a housing 12, a handset 14 and a key pad 16. Conventional control switches 20 and 22 may be provided for turning the telephone ringer on and off and for controlling the ringer volume. A lamp hood 18, having an oval generally semi-cylindrical elongated configuration, is connected by a stem 26 to a pivotal bracket recessed within a notch 28 formed in the telephone housing 12. A manual override switch 24 is provided for selectively activating and deactivating the lamp disposed within the hood 18.

Figure 2:
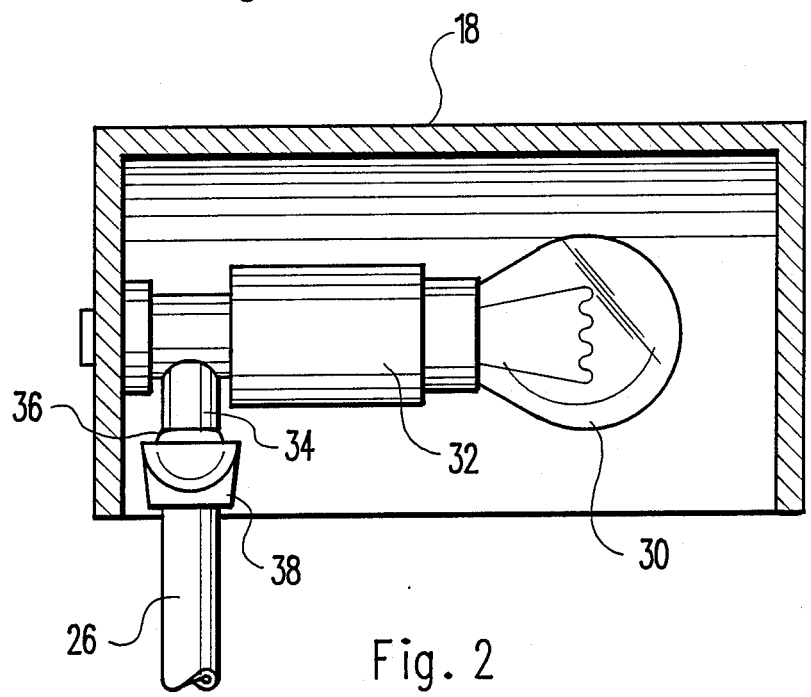
FIG. 2 is a detail view, partially in cross section, illustrating the adjustable connection of the lamp to the telephone housing.

FIG. 2 further illustrates the mounting of the lamp hood 18 on the stem 26. The lamp 30 is removably mounted in a socket 32 which includes a transverse stub portion 34 which terminates in a pivot ball 36. The pivot ball 36 is received in a cooperating mounting recess 38 formed at the end of the stem 26. The electrical connections for powering the lamp 30 extend through the socket 32, and through the hollow interior of the stem 26.

Figures 3, 4:
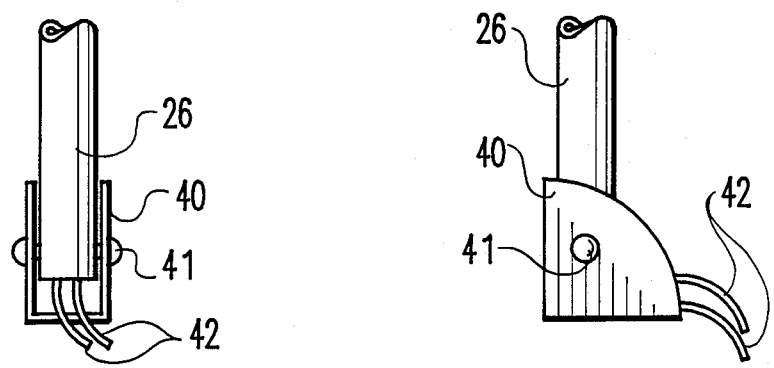
FIG. 3 is a front detail view, further illustrating the adjustable lamp connection.
FIG. 4 is a side view of the pivotal lamp connection of FIG. 3.

FIG. 3 illustrates the opposite end of the stem 26 which is pivotally mounted in a bracket 40 by a pin 41. The electrical leads 42 extend from the stem 26 to the interior of the housing 12 as illustrated in FIG. 1. The bracket 40 is recessed within the notch 28.

FIG. 4 is a side view which further illustrates the construction of the bracket 40.

Figure 5:
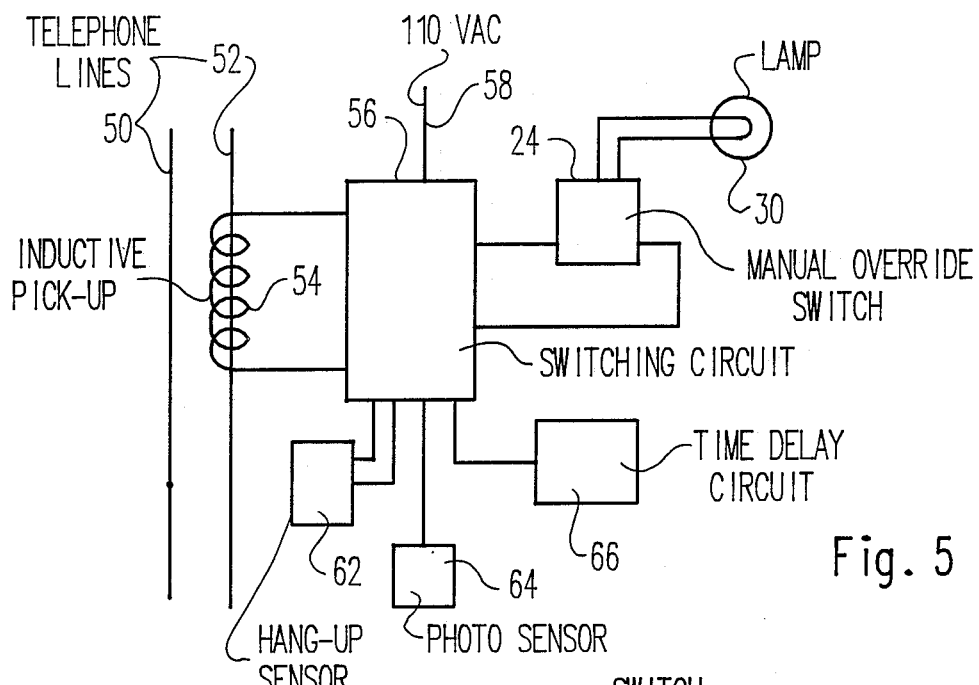
FIG. 5 is a schematic diagram illustrating an example circuit revealing basic fundamental components utilized in the present invention.

FIG. 5 illustrates the schematic diagram of the telephone indicator of the present invention. Telephone lines 50 and 52 transmit an incoming call to the telephone. An inductive pick-up 54 detects an incoming call and activates a switching circuit 56. The switching circuit 56 is connected to a photosensor 64 which senses ambient light adjacent the telephone. A no-signal or hang-up sensor 62 is connected to switching circuit 56 and provides an indication of call disconnection via pick-up 54. Upon disconnection of the call, a time delay circuit 66 provides a signal upon a predetermined time interval, for example one minute, for lamp 30 automatic de-energization. This allows an individual time to leave the room or finish taking a message after the call is disconnected. Upon detection of the incoming call by pick-up 54 and the sensing of a low ambient light level by the photosensor 64, the switching circuit 56, which may include relay type switching actuators or alternatively solid state latching circuits, operatively connects an incoming 110 Volt line 58 through an override switch 24 to light the lamp 30. The switch 24 includes a push button which is operative to reverse the position of the internal switch. For example, if the internal switch of the override unit 24 is in a closed position, the lamp 30 will be illuminated. By depressing the push button, the switch will be opened, thus turning off the lamp 30. This allows an individual to independently control the lamp 30 regardless of the ambient light level or the detection of an incoming call.

Figure 6:
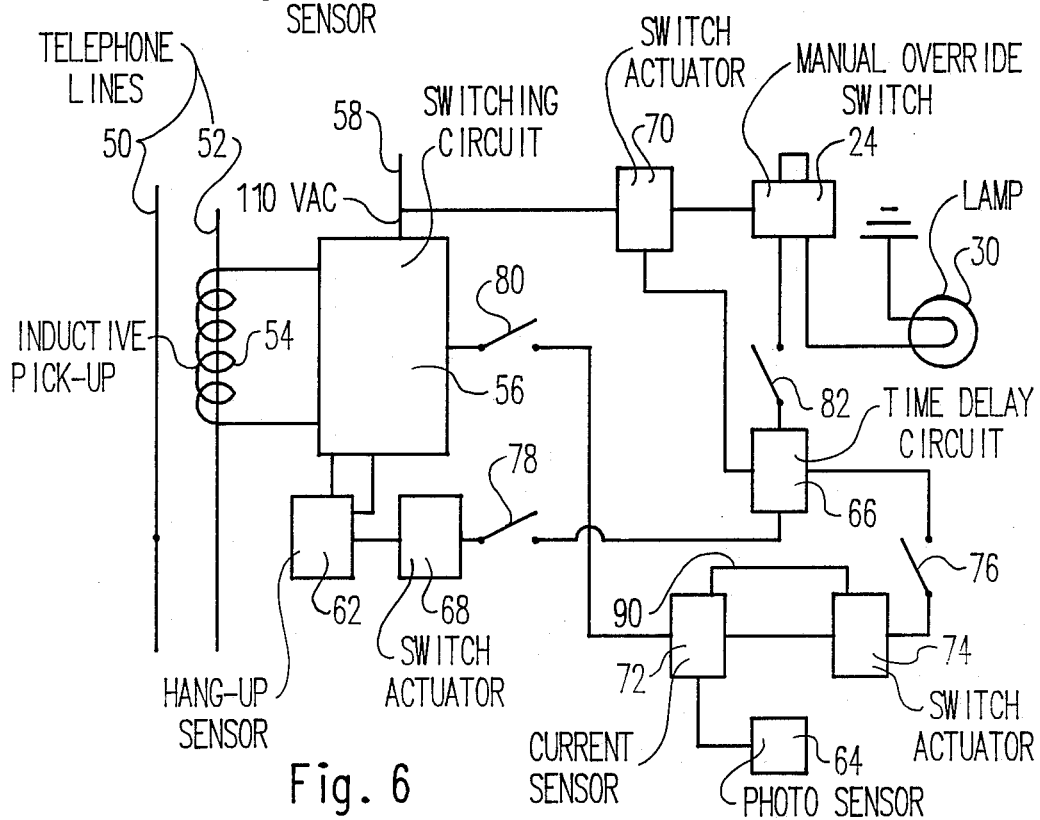
FIG. 6 is a schematic diagram illustrating a more detailed example circuit utilized in the present invention.

FIG. 6 illustrates a more specific schematic of an example circuit for use in the present invention. The phone line 52 transmits an incoming call via an inductive pick-up 54 to a switch activating circuit 56. The switch activator 56 closes a switch 80 and transmits a 110 Volt current from the power supply line 58 to a current sensor 72. If the photosensor 64 senses a low ambient light level, the low output current is sensed by a current sensor 72 which signals the switch activator 74 to close the switch 76. The power is then transmitted through a timing circuit 66 which resets the internal timer unit and closes switch 82 which causes the actuator 70 to close the internal switch of the override control 24, thus illuminating the lamp 30. If the photosensor detects a high ambient light level, the switch 76 remains open and the lamp 30 is not activated. The override control 24 includes a push button which reverses the current position of the internal switch. Thus, an individual may independently energize or de-energize the lamp 30. Upon disconnection of the telephone call, the absence of induction current from pick-up 54 is sensed by hang-up sensor 62, which causes switch actuator 68 to close switch 78 which activates the timing circuit 66 which allows line voltage to continue illumination of lamp 30 until current is cut manually by push button 24 or until switch 82 is opened automatically after a predetermined time period by timing circuit 66.

When call hang-up is detected by hang-up sensor 62 from induction pick-up via switch activating circuit 56, a return signal is sent to the switch activating circuit 56 from hang-up sensor 62 which cuts power through switches 80 and 76.

The switch activating circuit 56 has a built in slight time delay device which momentarily keeps line voltage 58 flowing to lamp 30, even after hang-up. This eliminates momentary cut out of lamp illumination between circuit functions.

When switch actuator 74 closes switch 76, the return line 90 carries a signal from switch actuator 74 to current sensor 72 which signals current sensor 72 to ignore current levels from photo sensor 64.

This will keep the circuit closed until reopened manually by push button 24 or reopened automatically by timing circuit 66. This eliminates false signalling from photo sensor 64 of an ambient light level to open the circuit when the ambient light is generated by the illuminated lamp 30 itself. In effect, once the current sensor 72 performs its function of signalling closing of the circuit, it essentially ignores photo sensor 64 current levels until circuit is reset by switch activating circuit 56.

The switches 76, 78, 80 and 82 in these example circuits of FIG. 5 and FIG. 6 are normally open. The switches close from the electric power allowed to flow through the circuitry; given that certain conditions of light and time are met to allow full passing of current to the lamp 30.

Figure 7:
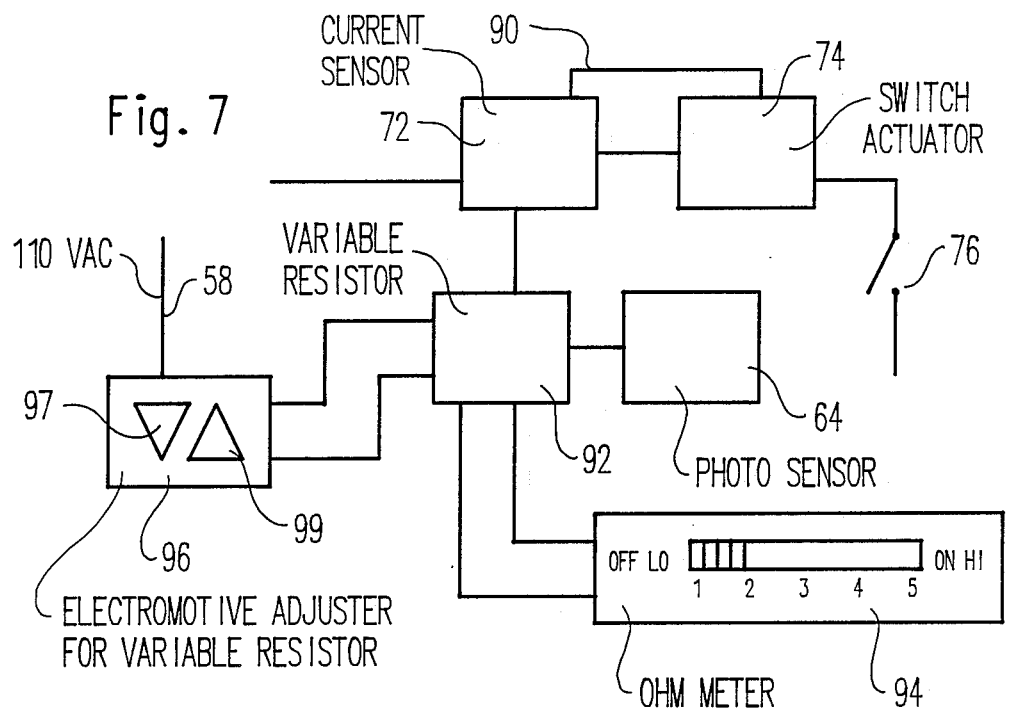
FIG. 7 is a schematic diagram illustrating a circuit allowing adjustment of the ambient light level at which a photo sensor controlled lamp will be illuminated.

As shown in FIG. 7, the amount of photo generated current from photo cell 64 can be adjusted by a variable resistor unit 92 according to preference of lighting conditions under which lamp 30 will automatically illuminate. The variable resistor unit 92 consists of an electromotive type adjuster which positions two identical variable resistors according to selections made on the setting board 96. Both variable resistors within variable resistor unit 92 are adjusted simultaneously. One variable resistor is used in the adjustment of resistance on photo current from photo sensor 64 to current sensor 72. The second variable resistor is connected to bar LED 94. Bar LED 94 is an ohm meter which displays the adjustment resistance of the load placed upon the photo current from photo sensor 64 by the second variable resistor.

The setting board 96 is used to select the lighting condition under which lamp 30 will illuminate. The setting board 96 includes a switch 97 which decreases the amount of resistance within the variable resistor unit 92. When switch 97 is depressed, line voltage 58 is transferred to the electromotive adjuster, within the variable resistor unit 92, which positions the variable resistor in such a manner as to progressively decrease the resistance on the photo current from photo sensor 64. This allows more current to reach the current sensor 72 which will keep lamp 30 off under more dimly lit conditions. While switch 97 is depressed, the selection is displayed visually on bar LED 94 which displays progressively a decreasing number of illuminated bar toward the "off lo" end of the bar LED 94. The "off lo" on the bar LED 94 refers to lower tolerated light intensity for lamp 30 not to automatically energize.

Another component of the setting board 96 is switch 99, which increases resistance of the variable resistor within the variable resistor unit 92. When switch 99 is depressed, line voltage 58 is transmitted to the electromotive adjuster, within variable resistor unit 92, which positions the variable resistor in such a manner as to progressively increase the resistance on the photo current from photo sensor 64. This allows less current to reach the current sensor 72 which will allow lamp 30 to automatically energize under more brightly lit conditions. When switch 99 is depressed, the selection is visually displayed on bar LED 94 which displays progressively an increasing number of illuminated bars toward the "on hi" end of the bar LED 94. The "on hi" refers to tolerances of higher light level intensity for automatic lamp 30 illumination.

This setting unit employed within the photo sensor circuit, allows an individual to program automatic lamp illumination, upon detection of incoming telephone call, to preference of environmental light intensities.

Despite the extra photo circuit circuitry, the push button switch 24 overrides all photo circuitry.

Figure 8:
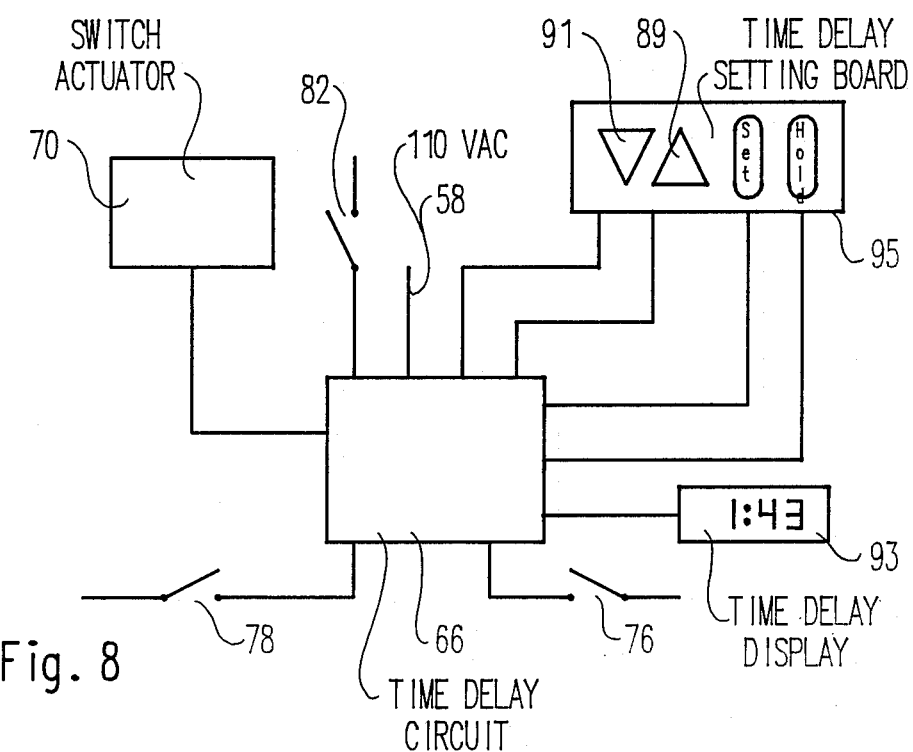
FIG. 8 is a schematic diagram illustrating a circuit allowing adjustment of the time delay period between disconnection of a call and shut-off of a lamp.

As shown in FIG. 8, the amount of predetermined time delay within timing circuit 66 for de-energization of lamp 30 can be selected as desired by making selection on setting board 95. The amount of selected time as programmed on setting board 95 is displayed on LED 93. The electrical signals for the numeral illumination of the LED 93 are transmitted by the programmable timer circuit 66. When the timer circuit 66 is activated by the hang-up sensor 62 (FIG. 6), the countdown before lamp 30 de-energization is displayed on LED 93. The LED 93 displays any activity of timer circuit 66.

The setting board 95 consists of a switch 91 which, when depressed, lessens the amount of programmed time delay within timer circuit 66. The lessening of time delay for earlier lamp 30 de-energization after hang-up is displayed on LED 93.

Another component of setting board 95 is switch 89 which, when depressed, increases the amount of time delay within timer circuit 66. This increasing of time delay, when switch 89 is depressed to allow longer illumination of lamp 30 after hang-up, is visually displayed on LED 93.

After desired delay time is selected by using switches 91 or 93, the time is programmed into a timer module within timer circuit 66 by depressing the "set" button on setting board 95.

Another component of the setting board 95 is a "hold" button which stops the countdown and keeps lamp 30 illuminated indefinitely until the "set" button is depressed which continues the timer countdown to lamp 30 de-energized.

Despite the extra circuitry, push button switch 24 overrides all timer circuitry.

It should be noted that the switch actuators utilized in the present invention may comprise relays or solid state switching units. Instead of utilizing 110 volt current to energize the lamp 30, the device may be easily modified to utilize telephone line voltage for both the activation of the switching units and for powering the lamp 30. The use of this alternative arrangement is considering to fall within the scope of the present invention.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A telephone call indicator, comprising:
   a telephone connected to a telephone signal line;
   inductive sensing means for sensing an incoming call signal on said telephone line;
   photosensor means for sensing ambient light adjacent said telephone;
   current sensing means operably connected for sensing output current of said photosensor means;
   lamp means;
   switching means operably connected to said current sensing means, said inductive sensing means and said lamp means for energizing said lamp means upon detection of an incoming call on said telephone line only when ambient light adjacent said telephone is below a predetermined level;
   user actuated means for adjusting said predetermined level;
   hang-up sensor means operatively connected to said inductive sensing means for detecting disconnection of a call;
   time delay means operatively connected with said hang-up sensor means and said lamp means for de-energizing said lamp means at a predetermined time interval after disconnection of a call on said telephone line;
   user actuated means for adjusting said predetermined time interval;
   and
   manual override switching means for selectively energizing or de-energizing said lamp means independently of said signal sensing means and said photosensor means, without disabling said telephone call indicator.

2. The telephone call indicator of claim 1, further comprising means pivotally connecting said lamp means to said telephone.

3. The telephone call indicator of claim 2, further comprising:
   a stem having a first and second ends;
   a bracket pivotally securing said first end of said stem to said telephone:
   an elongated socket mounting said lamp;
   a stub portion extending transversely from said socket; and
   a ball and socket connection adjustably securing said stub portion to a second end of said stem.

4. The telephone call indicator of claim 1, wherein said manual override switching means comprises:
   an internal two position electrically actuated switch; and
   a manually actuated push button operative to reverse the position of said internal switch whereby said manual override switch is operative to illuminate said lamp from an initial de-energized condition and de-energize said lamp from an initial illuminated condition.

* * * * *